United States Patent
Wang et al.

(10) Patent No.: US 11,308,913 B2
(45) Date of Patent: Apr. 19, 2022

(54) DISPLAY DRIVING CIRCUIT AND DISPLAY PANEL

(71) Applicants: CHONGQING HKC OPTOELECTRONICS TECHNOLOGY CO., LTD., Chongqing (CN); HKC CORPORATION LIMITED, Guangdong (CN)

(72) Inventors: Mingliang Wang, Chongqing (CN); Lidan Ye, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 17/201,568

(22) Filed: Mar. 15, 2021

(65) Prior Publication Data

US 2022/0036850 A1    Feb. 3, 2022

(30) Foreign Application Priority Data

Jul. 28, 2020 (CN) .......................... 202010747829.3

(51) Int. Cl.
  *G09G 3/36* (2006.01)
  *G02F 1/1362* (2006.01)
  *G02F 1/1368* (2006.01)

(52) U.S. Cl.
  CPC ......... *G09G 3/3688* (2013.01); *G02F 1/1368* (2013.01); *G02F 1/136286* (2013.01);
  (Continued)

(58) Field of Classification Search
  CPC ......... G09G 3/3688; G09G 2310/0272; G09G 2320/0233; G02F 1/136286; G02F 1/1368
  See application file for complete search history.

(56) References Cited

U.S. PATENT DOCUMENTS

2009/0207333 A1* 8/2009 No .................... G02F 1/136259
                                                        349/54
2013/0293600 A1* 11/2013 Lee ...................... G09G 3/3258
                                                        345/691
(Continued)

FOREIGN PATENT DOCUMENTS

CN        104280970 A        1/2015
CN        105609038 A        5/2016
(Continued)

OTHER PUBLICATIONS

The First Chinese Office Action dated Jul. 21, 2021; Appln. No. 202010747829.3.

*Primary Examiner* — Sanghyuk Park
(74) *Attorney, Agent, or Firm* — Westbridge IP LLC (57) ABSTRACT

The present application provides a display driving circuit and display panel, including a drive, which includes a driving signal output terminal and an enable signal input terminal, the driving signal output terminal being electrically connected with a data line of the display panel; and a detector, which includes a detection signal input terminal and an enable signal output terminal, the detection signal input terminal is electrically connected with a gate signal terminal of a preset row of the display panel, and the enable signal output terminal is electrically connected with the enable signal input terminal of the drive; the detector is for detecting a gate signal of the preset row, and output a corresponding enable signal according to a detection result, (Continued)

and the drive is for outputting different driving signals according to different enable signals.

20 Claims, 2 Drawing Sheets

(52) U.S. Cl.
CPC ............... *G09G 2310/0272* (2013.01); *G09G 2320/0233* (2013.01)

(56) References Cited

U.S. PATENT DOCUMENTS

| | | | |
|---|---|---|---|
| 2018/0204520 A1 | 7/2018 | Kobayashi et al. | |
| 2018/0322844 A1* | 11/2018 | Lee | G09G 3/3696 |
| 2021/0157608 A1* | 5/2021 | Yu | G09G 3/36 |
| 2021/0407449 A1* | 12/2021 | Wang | G09G 3/3685 |

FOREIGN PATENT DOCUMENTS

| | | |
|---|---|---|
| CN | 205282051 U | 6/2016 |
| CN | 107452334 A | 12/2017 |
| CN | 108711400 A | 10/2018 |
| CN | 109192161 A | 1/2019 |
| CN | 109326262 A | 2/2019 |
| CN | 109346023 A | 2/2019 |
| CN | 109410883 A | 3/2019 |
| CN | 109509446 A | 3/2019 |
| CN | 109559696 A | 4/2019 |
| CN | 109754758 A | 5/2019 |
| KR | 20090081184 A | 7/2009 |
| WO | 2020/073231 A1 | 4/2020 |

* cited by examiner

DISPLAY DRIVING CIRCUIT AND DISPLAY PANEL

CROSS REFERENCE TO RELATED APPLICATIONS

The present application claims priority to a Chinese patent application No. 202010747829.3, filed on Jul. 28, 2020 with the China National Intellectual Property Administration, entitled "Display Driving Circuit And Display Panel", the entirety content of which is incorporated herein by reference.

TECHNICAL FIELD

The present application relates to a display technology field, particularly relates to a display driving circuit and display panel.

BACKGROUND

The statements herein only provide background information related to the present invention, and do not necessarily constitute prior art.

With the development of technology, the requirements for LCD TVs are becoming higher and higher, such as requiring for more and more higher resolution and more and more larger size. For the size becomes more larger, when the data line is charging the display panel, the charging difference between the near terminal and the far terminal is more and more obvious. A part of the display panel close to the driving terminal of the data line has a better charging effect and a higher brightness, and a part of the display panel far from the driving terminal of the data line has a poor charging effect and a lower brightness, resulting in an inconsistent display effect of the display panel.

SUMMARY

A main purpose of the present application provides a display driving circuit and display panel, aiming at solving a technical problem that due to a part of a big size of the display panel far from the data line driving terminal has a poor charging effect, such that there has display difference between a part far from the data line driving terminal and a part close to the data line driving terminal, resulting in an inconsistent display effect of the display panel.

In order to realize the above-mentioned purpose, the present application provides a display driving circuit for driving a display panel, including:

a drive including a driving signal output terminal and an enable signal input terminal, the driving signal output terminal being electrically connected with a data line of the display panel; and a detector including a detection signal input terminal and an enable signal output terminal, the detection signal input terminal being electrically connected with a gate signal terminal of a preset row of the display panel, and the enable signal output terminal being electrically connected with the enable signal input terminal of the drive;

wherein the detector is for detecting a gate signal of the preset row, and output a corresponding enable signal according to a detection result, and the drive is for outputting different driving signals according to different enable signals.

In one embodiment, the detector further comprises an initial signal input terminal, the detector is also for outputting an enable signal corresponding to an initial signal when the initial signal is input into the initial signal input terminal.

In one embodiment, the drive includes a data driving circuit, which includes:

a data driving module comprising a signal input terminal and a signal output terminal, and the signal output terminal being the driving signal output terminal of the drive;

a first current source for providing a first reference current signal;

a second current source for providing a second reference current signal; and a switch being switched according to an enable signal of the detector to connect the signal input terminal of the data driving module with the first current source or with the second current source.

In one embodiment, the detector includes:

a first semiconductor transistor, wherein a gate of the first semiconductor transistor is connected with the detection signal input terminal, and a source of the first semiconductor transistor is grounded; and a second semiconductor transistor, wherein a source of the second semiconductor transistor is connected with an external power source, a drain of the second semiconductor transistor is connected with the enable signal output terminal, and a drain of the first semiconductor transistor is connected with a drain of the second semiconductor transistor;

when the detection signal input terminal is input with a high-level signal, the first semiconductor transistor and the second semiconductor transistor are both conducted.

In one embodiment, the detector further includes a third resistor, the third resistor is connected between the detection signal input terminal and the drain of the second semiconductor transistor.

In one embodiment, the detector further includes a first resistor, one terminal of the first resistor is connected with the third resistor, and another terminal of the first resistor is grounded.

In one embodiment, the detector further includes a second resistor, one terminal of the second resistor is connected with the drain of the second semiconductor transistor, and another terminal of the second resistor is connected with a gate of the second semiconductor transistor.

In one embodiment, the detector further includes a third semiconductor transistor, a gate of the third semiconductor transistor is connected with the initial signal input terminal, a source of the third semiconductor transistor is grounded, and a drain of the third semiconductor transistor is connected with the enable signal output terminal; the third semiconductor transistor is conducted when the initial signal input terminal is input with the high-level signal.

The present application also provides a display driving circuit for driving a display panel, wherein the display driving circuit includes:

a drive including a driving signal output terminal and an enable signal input terminal, the driving signal output terminal being electrically connected with a data line of the display panel; and a detector including a detection signal input terminal and an enable signal output terminal, the detection signal input terminal being electrically connected with a gate signal terminal of a preset row of the display panel, and the enable signal output terminal being electrically connected with the enable signal input terminal of the drive;

wherein the detector is for outputting a first enable signal when a gate signal of the preset row is detected to be a low-level signal, and output a second enable signal when the gate signal of the preset row is detected to be a high-level signal, the drive outputs a first driving signal according to the first enable signal, the drive outputs a second driving signal according to the second enable signal, a current value of the first driving signal is less than a current value of the second driving signal.

Furthermore, the present application also provides a display panel, including:

a liquid crystal screen, which includes a data line and a scan line, the data line and the scan line are all connected with a thin film transistor on the liquid crystal screen, the scan line is for controlling the thin film transistor to turn on or turn off, the data line is for charging the thin film transistor;

a display driving circuit, which is connected with the liquid crystal screen and for driving the liquid crystal screen to drive;

wherein, the display driving circuit including:

a drive including a driving signal output terminal and an enable signal input terminal, the driving signal output terminal is electrically connected with a data line of the display panel; and a detector including a detection signal input terminal and an enable signal output terminal, the detection signal input terminal is electrically connected with a gate signal terminal of a preset row of the display panel, and the enable signal output terminal is electrically connected with the enable signal input terminal of the drive;

wherein the detector is for detecting a gate signal of the preset row, and output a corresponding enable signal according to a result of detecting the signal, and the drive is for outputting different driving signals according to different enable signals.

In embodiments of the present application, the display driving circuit is for driving the display panel 30, and it includes a drive and a detector. The display driving circuit detects the gate signal of the preset row by the detector, and inputs the detected gate signal into the drive by the enable signal terminal added on the drive. The drive outputs different driving signals according to the different enable signal. In such way, the driving signal of the data line of other rows after the preset row is increased to improve the charging effect of a part of a big size of the display panel far from the data line driving terminal, thereby deducing the display difference of the display panel and improving an consistency of the display effect of the display panel.

BRIEF DESCRIPTION OF THE DRAWINGS

For more clearly illustrate the technical solutions in the embodiments of the present application or the related art, the drawing figures required to use in the description of the embodiments or the related art will be simply introduced as below. Obviously, the drawings described as below are merely some embodiments of the present application. For one of ordinary skill in the art, the drawings of other embodiments can be obtained based on those drawings without creative work.

The realization of the purposes, functional characteristics, and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described in conjunction with the drawings in the embodiments of the present application as below. Obviously, the described embodiments are only a portion of the embodiments of the present application, rather than all the embodiments. Based on the embodiments in the present application, all other embodiments obtained by one of ordinary skill in the art without any creative work shall fall within the protection scope of the present application.

It should be noted that all directional indications (such as up, down, left, right, front, back . . . ) in the embodiments of the present application are only set to explain the relative position relationship, movement situation, etc. between components in a specific posture (as shown in the accompanying drawings). If the specific posture changes, the directional indication will change accordingly.

In addition, the description of "first", "second", etc. involved in the embodiments of the present application are only set for descriptive purposes, and cannot be understood as indicating or implying their relative importance or implicitly indicating a number of indicated technical features. Therefore, the features defined with "first", "second" may explicitly or implicitly include at least one of the features. In addition, the technical solutions between the various embodiments can be combined with each other, but must be based on what can be achieved by one of ordinary skill in the art. When a combination of technical solutions is contradictory or cannot be achieved, it should be considered that such a combination of technical solutions does not exist, and is not within the protection scope required by the present application.

The present application provides a display driving circuit, applied on a big size display panel, for driving the display panel.

Figure 1:
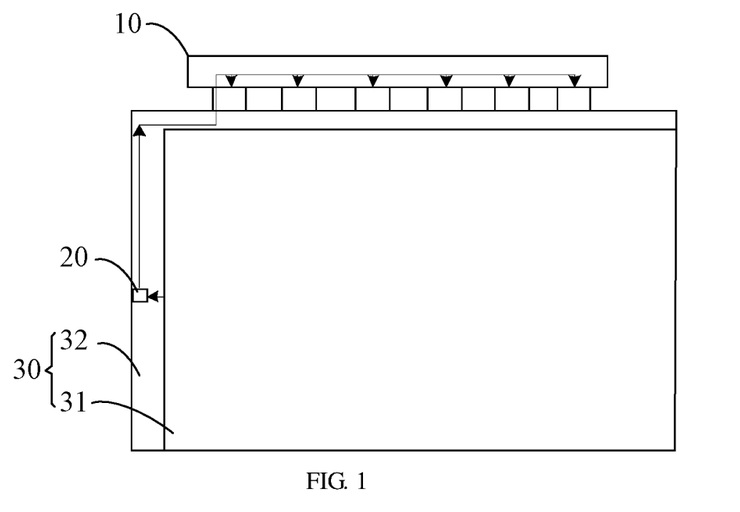
FIG. 1 is a schematic diagram of a connection structure of a display driving circuit according to an embodiment of the present application.
Figure 2:
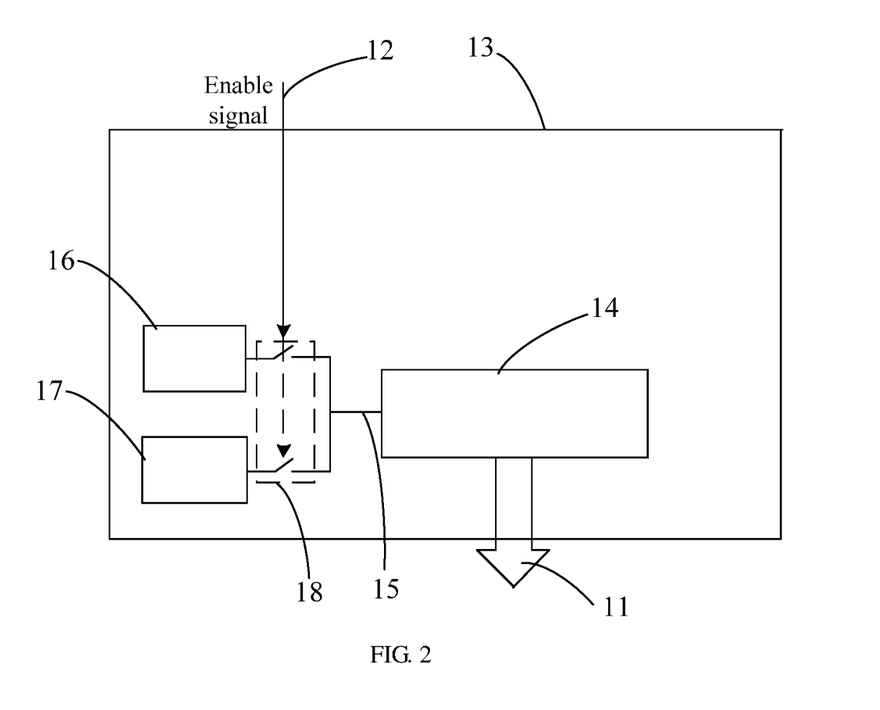
FIG. 2 is a schematic structural diagram of a drive of the display driving circuit according to an embodiment of the present application.
Figure 3:
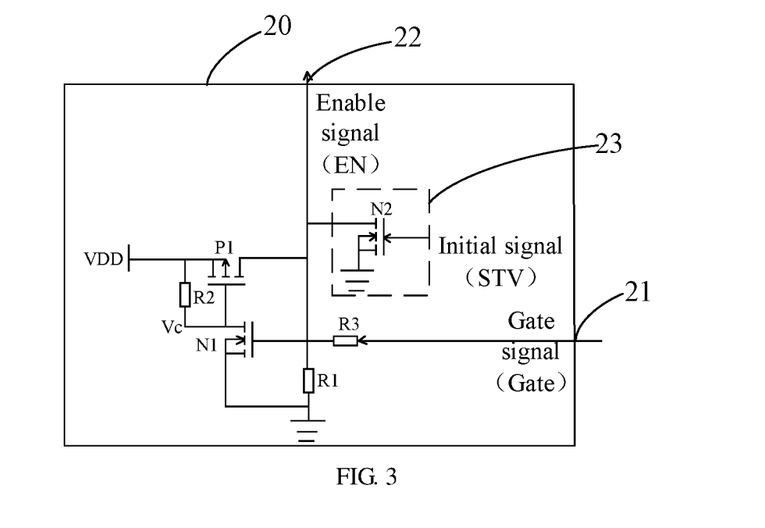
FIG. 3 is a schematic diagram of a circuit structure of a detector of the display driving circuit according to an embodiment of the present application.

Referring to FIGS. 1 and 3, FIG. 1 is a schematic diagram of a connection structure of the display driving circuit of the present application; FIG. 2 is a schematic diagram of a drive of the display driving circuit of the present application; and FIG. 3 is a schematic diagram of a detector of the display driving circuit of the present application.

Specifically referring to FIGS. 1 and 2, the present application provides a display driving circuit, which includes a drive 10 and a detector 20. The drive 10 includes a driving signal output terminal 11 and an enable signal input terminal 12. The driving signal output terminal 11 is electrically connected with a data line of the display panel 30. Specifically referring to FIG. 3, the detector 20 includes a detection signal input terminal 21 and an enable signal output terminal 22. The detection signal input terminal 21 is electrically connected with a gate signal terminal of a preset row of the display panel 30, the enable signal output terminal 22 is electrically with the enable signal input terminal 12 of the drive 10. The detector 20 is for detecting a gate signal of the preset row and output a corresponding enable signal according to a result of detecting the gate signal. The drive 10 is for outputting different driving signals according to different enable signals.

The drive 10 is for transmitting current to the data line of the display panel 30, and thus to charge pixel electrodes connected with the data line. Specifically, the driving signal output terminal 11 of the drive 10 is connected with one end of the data line, the data line is sequentially connected with the pixel electrodes from the driving signal output terminal 11 toward a direction away from the driving signal output terminal 11. The pixel electrodes are charged by the data line. Due to there is a load on the data line, there is a loss of power and a time delay during the transmission of current, thus the charging effect of the pixel electrodes far from the driving signal output terminal 11 gradually deteriorates. In this embodiment, a charging effect of the pixel electrodes starting from the preset row of the display panel 30 is different from a charging effect of the pixel electrodes close to the driving signal output terminal 11. The preset row is determined according to the actual display situation of each display panel 30, specifically a row starting from which the display brightness of the display panel 30 gradually decreases is determined to be the preset row according to experimental data.

Figure 4:
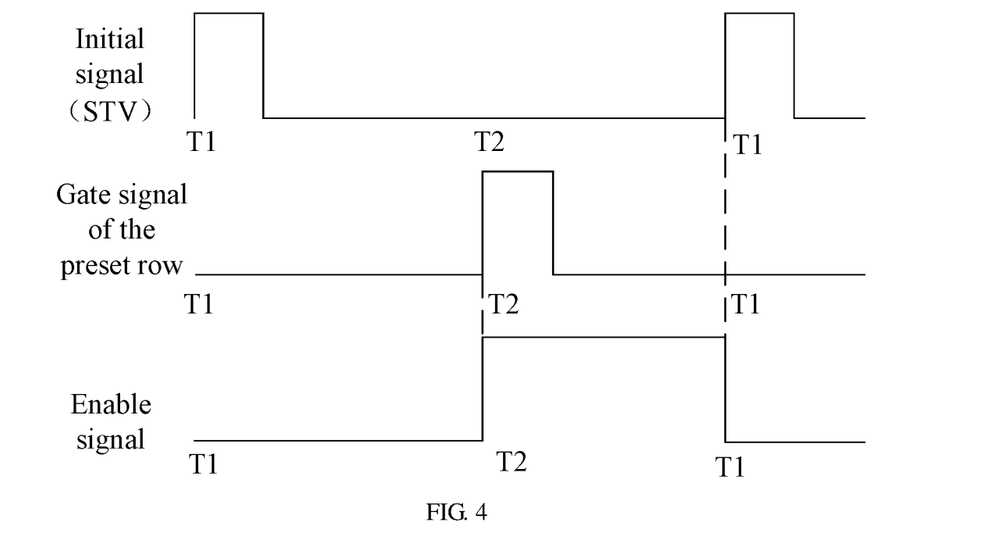
FIG. 4 is a signal waveform diagram of the detector of the display driving circuit according to an embodiment of the present application.

In order to ensure that the display effect of each position of the display panel 30 is consistent, the detector 20 is provided in this embodiment to detect whether the current scanning position of the display panel 30 is the preset row, that is, the detector 20 is provided with the detection signal input terminal 21 and the enable signal output terminal 22. The detection signal input terminal 21 is electrically connected with a gate signal terminal of the preset row. Specifically referring to FIG. 4, FIG. 4 is a signal waveform diagram of the detector of the display driving circuit of the present application, where T2 is a corresponding time when the display panel 30 currently scans to a position of the preset row. When the current scan position of the display panel 30 is the preset row, the gate signal terminal of the preset row is input with a high-level signal. At the moment, the detection signal input terminal 21 receives the high-level signal and transmits the high-level signal to the enable signal output terminal 22. The enable signal output terminal 22 is electrically connected with the enable signal input terminal 12 of the drive 10. When the enable signal input terminal 12 of the drive 10 is input with the high-level signal, it is determined that the current scanning position is the preset row. When the display panel 30 scans to the preset row, the drive 10 starts to change the driving signal, such that a driving signal of the pixel electrodes of other rows after the preset row is enhanced, and the charging effect of the pixel electrodes of other rows after the preset row is improved.

In this embodiment, the detector 20 is provided at an edge area of the panel and is located in a non-display area 32 of the edge area. The detector 20 is electrically connected with a gate of a thin film transistor of the preset row. The detector 20 receives the gate signal of the preset row, that is, it is considered that the charging effect of the display area 31 from and after the preset row is poor and needs to be supplemented, specifically needs to be supplemented by changing the driving signal of the drive 10.

The display driving circuit provided in this embodiment is for driving the display panel 30, and it includes a drive 10 and a detector 20. The display driving circuit detects the gate signal of the preset row by the detector 20, and inputs the detected gate signal to the drive 10 by the enable signal terminal 12 added on the drive 10. The drive 10 outputs different driving signals according to different enable signals. In such way, the driving signal of the data line of other rows after the preset row is increased to improve the charging effect of a part of a big size display panel far from the driving terminal of the data line, thereby reducing the display difference of the display panel and improving an consistency of the display effect of the display panel.

Further, there are many ways to change the driving signal of the drive 10 to compensate the display panel 30. For example, when the drive 10 receives the enable signal input by the detecting unit 20, a timing control signal of a timing control circuit is changed to change the driving signal. For another example, at least two current sources are provided in the drive 10, and when the drive 10 receives the enable signal input by the detecting unit 20, the driving signal is changed by switching a current source. Please continue to refer to FIG. 2, the details are as follows:

the drive 10 includes a data driving circuit 13, which includes:

a data driving module 14, including a signal input terminal and a signal output terminal, and the signal output terminal being the driving signal output terminal 11 of the drive 14;

a first current source 16 for providing a first reference current signal;

a second current source 17 for providing a second reference current signal; and a switch 18 being switched according to an enable signal of the detector 20 to connect the signal input terminal of the data driving module 14 with the first current source 16 or the second current source 17.

The data driving module 14 is a control module driven by the data line. The data driving module 14 includes a signal input terminal 15 and a signal output terminal 14. The signal output terminal 11 is a driving signal output terminal 11 of the drive 10 and is electrically connected with the data line. The signal input terminal 15 is a current signal input terminal and is for connecting with the first current source 16 or the second current source 17. The data driving module 14 also includes a timing signal input terminal. The timing signal input terminal is electrically with the timing control circuit and is for receiving a control timing signal output by the timing control circuit.

The switch 18 is an electronic switch and is electrically connected with the enable signal input terminal 12. The switch 18 is switched according to the enable signal input from the enable signal input terminal 12. For example, when the received enable signal is a high-level enable signal, the first current source 16 is switched to the second current source 17, such that the signal input terminal 15 of the data driving module 14 is connected with the second current source 17, and the data driving module 14 outputs a corresponding driving signal according to a reference current signal corresponding to the second current source 17. When the received enable signal is a low-level enable signal, the second current source 17 is switched to the first current source 16, such that the signal input terminal 15 of the data driving module 14 is connected with the first current source 16, and the data driving module 14 outputs a corresponding driving signal according to a reference current signal corresponding to the first current source 16. A current value of the first reference current signal provided by the first current source 16 is smaller than a current value of the second reference current signal provided by the second current source 17. The current output by current sources are used as reference output currents of the drive 10, the greater the currents of the current sources, the stronger the output capability of the current source. The present application adopts the second current source 17 to provide the second reference current signal when the display panel 30 scans the preset row and other rows after the preset row, due to the current value of the second reference current signal provided by the second current source 17 is larger, the output capability of the second current source 17 is stronger, it achieves the purpose of enhancing the driving capability and effectively improving the inconsistency of driving the part of the display panel far from the data line driving terminal and the part of the display panel close to the data line driving terminal.

In addition, this embodiment adopts different current sources to provide different currents to the display panel 30 to improve the charging capability of each position of the display panel 30, that is, the display of each position of the display panel 30 is compensated based on current, such that the display effect of each position of the compensated display panel 30 is better.

Due to the high-level signal only remains a moment when scanning to a current row and then is switched to the low-level signal, in order to ensure that the preset row and all rows after the preset row are provided with the second reference current signal by the second current source 17, and the display brightnesses of all areas after the preset row are consistent, the enable signal output by the enable signal output terminal 22 needs to be maintained to be a high-level enable signal after the preset row. Specifically, each row after the preset row can be provided with a detector 20, thereby realizing that the enable signals output by the enable signal output terminal 22 are all high-level enable signals after the preset row. Or, a self-locking module is provided in the detector 20. After the detector 20 detects a high-level signal, the self-locking module of the detector 20 is self-locked so that the enable signal output terminal 22 of the detector 20 always outputs the high-level enable signal. Based on this, due to that the display panel 30 restarts scanning from an initial row after completing a scan cycle, but the detector 20 still outputs the high-level enable signal, it results in that the second current source 17 is still adopted to provide the second reference current signal when the drive 10 inputs the driving signal to the end of the display panel 30 close to the driving signal output terminal 11, and the brightness of the part of the display panel 30 close to the driving signal output terminal 11 is too much bright. In order to prevent the detector 20 from always outputting the high-level enable signal, it is necessary to reset the detector 20, that is, pull down the enable signal of the detector 20, when the display panel 30 performs the next scan cycle. Specifically, the detector 20 further includes an initial signal input terminal 23, and is for outputting an enable signal corresponding to an initial signal input through the initial signal input terminal 23. The initial signal input terminal 23 is an STV signal. As shown in FIG. 4, T1 is a time of inputting the initial information. When the initial row of the display panel 30 is scanned, the timing control circuit outputs the initial signal to the drive 10. After receiving the initial signal, the detector 20 outputs a low-level enable signal through the enable signal output terminal 22, so that when the initial line is scanned, based on the low-level enable signal, the switch 18 is switched to the first current source 16 to drive the data line with the first reference current signal of the first current source 16.

Specifically, please continue to refer to FIG. 3, the detector 20 includes: a first semiconductor transistor N1 and a second semiconductor transistor P1.

A gate of the first semiconductor transistor N1 is connected with the detection signal input terminal 21, a source of the first semiconductor transistor N1 is grounded, and a drain of the first semiconductor transistor N1 is connected with a drain of the second semiconductor transistor P1; and a source of the second semiconductor transistor P1 is connected with an external power source, a drain of the second semiconductor transistor P1 is connected with the enable signal output terminal 22;

when the detection signal input terminal 21 is input with the high-level signal, the first semiconductor transistor N1 and the second semiconductor transistor P1 are both conducted.

The gate of the first semiconductor transistor N1 is connected with the detection signal input terminal 21. When the detection signal input terminal 21 is input with the high-level signal, a voltage difference is formed between the gate and the drain of the first semiconductor transistor N1. The gate of the first semiconductor transistor N1 is conducted to conduct the source and the drain of the first semiconductor transistor N1. After the first semiconductor transistor N1 is conducted, the drain of the second semiconductor transistor P1 is grounded by the first semiconductor transistor N1. A drain voltage of the second semiconductor transistor P1 is 0. The source of the second semiconductor transistor P1 is connected with an external voltage. A voltage difference between the drain and source of the second semiconductor transistor P1 is less than a preset value, and the second semiconductor transistor P1 is conducted. After the second semiconductor transistor P1 is conducted, the enable signal output terminal 22 outputs the high-level enable signal based on the external power source. In such way, it is realized that when the detector 20 detects the high-level signal, the first semiconductor transistor N1 and the second semiconductor transistor P1 are both conducted, the enable signal output terminal 22 outputs the high-level enable signal, and the drive 10 outputs a corresponding driving signal based on the high-level enable signal.

Conversely, when the detection signal input terminal 21 is input with a low-level signal, the voltage difference between the gate and the source of the first semiconductor transistor N1 is not enough to make the first semiconductor transistor N1 conduct. The voltages of the drain and source of the second semiconductor transistor P1 are the same and no voltage difference exists therebetween, the second semiconductor transistor P1 is turned off, thereby the enable signal output terminal 22 directly outputs the low-level enable signal input through the detection signal input terminal 21, and the drive 10 outputs a corresponding driving signal based on the low-level enable signal.

In this embodiment, the first semiconductor transistor is an N-type semiconductor transistor, the second semiconductor transistor is a P-type semiconductor transistor. The N-type semiconductor transistor is conducted when a voltage difference between a gate and a source of the N-type semiconductor transistor is greater than a certain value, and turned off when the voltage difference between the gate and the source of the N-type semiconductor transistor is less than the certain value. The P-type semiconductor transistor is conducted when a voltage difference between a gate and a source of the P-type semiconductor transistor is less than a certain value, and turned off when the voltage difference between the gate and the source of the P-type semiconductor transistor is greater than the certain value.

Based on the above-mentioned detector 20, in order to realize that the enable signal output terminal 22 always outputs the high-level enable signal, thereby the driving signal corresponding to the second reference current signal provided by the second current source 17 is used to drive the data line when scanning each row after the preset row the self-locking module is provided in the detector 20. For example, a third resistor R3 is provided in the detector 20, specifically the third resistor R3 is connected between the detection signal input terminal 21 and the drain of the second semiconductor transistor P1, and the third resistor R3 is also connected with the gate of the first semiconductor transistor N1.

When the detection signal input terminal 21 is input with a high-level signal, the first semiconductor transistor N1 and the second semiconductor transistor P1 are conducted, and the enable signal output terminal 22 outputs the high-level enable signal. When the detection signal input terminal 21 is input with a low-level signal, due to the third resistor R3 is connected between the detection signal input terminal 21 and the drain of the second semiconductor transistor P1, a voltage between the third resistor R3 and the drain of the second semiconductor transistor P1 is equal to a voltage of the external power source. The third resistor R3 provides a high voltage to the gate of the first semiconductor transistor N1, thus a voltage difference is formed between the gate and the source of the first semiconductor transistor N1. The first semiconductor is conducted. At the moment, the second semiconductor transistor P1 also remains being conducted, so that the enable signal output terminal 22 remains outputting the high-level signal.

When an initial signal (STV) of a next frame arrives, it means that the display panel 30 needs to restart scanning from the initial row. In order to ensure that the enable signal output by the enable signal output terminal 22 at this time is a low-level signal, the detector 20 further includes a third semiconductor transistor N2. A gate of the third semiconductor transistor N2 is connected with the initial signal input terminal 23, a source of the third semiconductor transistor N2 is grounded, and a drain of the third semiconductor transistor N2 is connected with the enable signal output terminal 22. When the initial signal input terminal 23 inputs a high-level signal, the third semiconductor transistor N2 is conducted. The source and the drain of the third semiconductor transistor N2 are conducted, and the source of the third semiconductor transistor N2 is grounded. In such way, the enable signal output terminal 22 outputs the low-level enable signal, thereby realizing that the enable signal from the enable signal output terminal 22 is pulled down when the display panel 30 is rescanned. Based on the low-level enable signal, a corresponding driving signal is switched to drive the data line.

Further, the detector 20 further includes a first resistor R1, one terminal of the first resistor R1 is connected with the third resistor R3, and the other terminal of the first resistor R1 is grounded. The detector 20 further includes a second resistor R2, one terminal of the second resistor R2 is connected with the source of the second semiconductor transistor P1, and the other terminal of the second resistor R2 is connected with the gate of the second semiconductor transistor P1. The first resistor R1 protects the first semiconductor transistor N1, and the second resistor R2 protects the second semiconductor transistor P1.

In one embodiment, please continue to refer to FIGS. 1 and 3, the present application also provides a display driving circuit, which includes:

a drive 10, the drive 10 includes a driving signal output terminal 11 and an enable signal input terminal 12, the driving signal output terminal 11 is electrically connected with a data line of the display panel 30; and a detector 20, the detector 20 includes a detection signal input terminal 21 and an enable signal output terminal 22, the detection signal input terminal 21 is electrically connected with a gate signal terminal of a preset row of the display panel 30, and the enable signal output terminal 22 is electrically connected with the enable signal input terminal 12 of the drive 10.

The detector 20 is for outputting a first enable signal when a gate signal of the preset row is detected to be a low-level signal, and output a second enable signal when the gate signal of the preset row is detected to be a high-level signal, the drive 10 is for outputting a first driving signal according to the first enable signal, and outputting a second driving signal according to the second enable signal, a current value of the first driving signal is less than a current value of the second driving signal.

In this embodiment, the display driving circuit is similar to the display driving circuit described in the above embodiments, and will not be repeated here. The difference is that the detector 20 in this embodiment is for detecting a gate signal of the preset row. When the gate signal is a low-level signal, the enable output terminal of the detector 20 outputs the first enable signal, when it is detected that the gate signal of the preset row is a high-level signal, the enable output terminal of the detector 20 outputs the second enable signal. The drive 10 outputs the first driving signal according to the first enable signal, and outputs the second driving signal according to the second enable signal. For the current value of the second driving signal is greater than the current value of the first driving signal, when the preset row is scanned, the second driving signal with a larger current is adopted to drive the data line, such that the driving capability of the data line of the rows after the preset row become larger, thereby compensating for the loss in the data line far from the driving terminal to ensure that the charging effect of each position of the display panel 30 is consistent.

Further, the present application also provides a display panel, the display panel includes:

a liquid crystal screen, the liquid crystal screen includes a data line and a scan line, the data line and the scan line are all connected with a thin film transistor of the liquid crystal screen, the scan line is for controlling the thin film transistor to turn on or turn off, and the data line is for charging the thin film transistor;

a display driving circuit, the display driving circuit is connected with the liquid crystal screen and for driving the liquid crystal screen to display.

Please refer to FIGS. 1 to 3, the display driving circuit includes:

a drive 10, the drive 10 includes a driving signal output terminal 11 and an enable signal input terminal 12, the driving signal output terminal 11 is electrically connected with the data line of the display panel 30; and a detector 20, the detector 20 includes a detection signal input terminal 21 and an enable signal output terminal 22, the detection signal input terminal 21 is electrically connected with a gate signal terminal of a preset row of the display panel 30, and the enable signal output terminal 22 is electrically connected with the enable signal input terminal 12 of the drive 10.

The detector 20 is for detecting a gate signal of the preset row, and output a corresponding enable signal according to the gate signal, and the drive 10 is for outputting different driving signals according to different enable signals.

In other embodiments, the liquid crystal screen includes a plurality of pixel units and thin film transistors provided with the pixel units, thin film transistors of a same column of pixel units are connected with at least one of data lines, and charged through the at least one of data lines. Thin film transistors of a same row of pixel units are connected with at least one of scan lines, and controlled to be turned on or off through the at least one of scan lines.

Specifically referring to FIG. 1, the display panel 30 has a display area 31 and a non-display area 32. The non-display area 32 is located surrounding the display area 31, and the detector 20 is located in the non-display area 32, which can ensure that the detector 20 can be electrically connected with the gate of the preset row without affecting the display of the display area 31.

The display driving circuit in the display panel 30 of this embodiment adopts the display driving circuit described in the above-mentioned embodiments. This embodiment thus has the effects achieved by the display driving circuit of the above-mentioned embodiments. The display panel 30 adopts the display driving circuit to improve an uniformity of display brightness of the display panel 30.

The above descriptions are only optional embodiments of the present application, and do not limit the scope of the present application. Under the concept of the present application, the equivalent structure transformations made by using the description and drawings of the present application, or direct/indirect applications to other related technical fields are all included in the claimed scope of the present application.

What is claimed is:

1. A display driving circuit for driving a display panel, comprising:
    a drive comprising a driving signal output terminal and an enable signal input terminal, the driving signal output terminal being electrically connected with a data line of the display panel; and
    a detector comprising a detection signal input terminal and an enable signal output terminal, the detection signal input terminal being electrically connected with a gate signal terminal of a preset row of the display panel, and the enable signal output terminal being electrically connected with the enable signal input terminal of the drive;
    wherein the detector is for detecting a gate signal of the preset row, and output a corresponding enable signal according to a detection result, and the drive is for outputting different driving signals according to different enable signals.

2. The display driving circuit according to claim 1, wherein the detector further comprises an initial signal input terminal, the detector is also for outputting an enable signal corresponding to an initial signal input through the initial signal input terminal.

3. The display driving circuit according to claim 2, wherein the detector comprises:
    a first semiconductor transistor, wherein a gate of the first semiconductor transistor is connected with the detection signal input terminal, and a source of the first semiconductor transistor is grounded; and
    a second semiconductor transistor, wherein a source of the second semiconductor transistor is connected with an external power source, a drain of the second semiconductor transistor is connected with the enable signal output terminal, and a drain of the first semiconductor transistor is connected with a drain of the second semiconductor transistor;
    when the detection signal input terminal is input with a high-level signal, the first semiconductor transistor and the second semiconductor transistor are both conducted.

4. The display driving circuit according to claim 3, wherein the detector further comprises a third resistor, the third resistor is connected between the detection signal input terminal and the drain of the second semiconductor transistor.

5. The display driving circuit according to claim 4, wherein the detector further comprises a first resistor, one terminal of the first resistor is connected with the third resistor, and another terminal of the first resistor is grounded.

6. The display driving circuit according to claim 3, wherein the detector further comprises a second resistor, one terminal of the second resistor is connected with the drain of the second semiconductor transistor, and another terminal of the second resistor is connected with a gate of the second semiconductor transistor.

7. The display driving circuit according to claim 3, wherein the detector further comprises a third semiconductor transistor, a gate of the third semiconductor transistor is connected with the initial signal input terminal, a source of the third semiconductor transistor is grounded, and a drain of the third semiconductor transistor is connected with the enable signal output terminal; the third semiconductor transistor is conducted when the initial signal input terminal is input with the high-level signal.

8. The display driving circuit according to claim 3, wherein a self-locking module is provided in the detector, and the self-locking module of the detector is for being self-locked to enable the enable signal output terminal of the detector to always output a high-level enable signal, after the detector detects the high-level signal.

9. The display driving circuit according to claim 8, wherein the self-locking module is a third resistor, the third resistor is connected between the detection signal input terminal and the drain of the second semiconductor transistor, and the third resistor is connected with the gate of the first semiconductor transistor.

10. The display driving circuit according to claim 3, wherein the first semiconductor transistor is an N-type semiconductor transistor, the second semiconductor transistor is a P-type semiconductor transistor.

11. The display driving circuit according to claim 1, wherein the drive comprises a data driving circuit, which comprises:
    a data driving module comprising a signal input terminal and a signal output terminal, and the signal output terminal being the driving signal output terminal of the drive;
    a first current source for providing a first reference current signal;
    a second current source for providing a second reference current signal; and
    a switch being switched according to an enable signal of the detector to connect the signal input terminal of the data driving module with the first current source or with the second current source.

12. The display driving circuit according to claim 11, wherein a current value of the first reference current signal provided by the first current source is less than a current value of the second reference current signal provided by the second current source.

13. The display driving circuit according to claim 1, wherein at least two current sources are provided in the drive and switchable therebetween to change driving signals according to different enable signals input by the detector and received by the drive.

14. The display driving circuit according to claim 1, wherein the data driving module further comprises a timing signal input terminal, the timing signal input terminal is electrically connected with a timing control circuit and for receiving a timing signal output by the timing control circuit.

15. A display driving circuit for driving a display panel, wherein the display driving circuit comprises:
- a drive comprising a driving signal output terminal and an enable signal input terminal, the driving signal output terminal being electrically connected with a data line of the display panel; and
- a detector comprising a detection signal input terminal and an enable signal output terminal, the detection signal input terminal being electrically connected with a gate signal terminal of a preset row of the display panel, and the enable signal output terminal being electrically connected with the enable signal input terminal of the drive;
- wherein the detector is for outputting a first enable signal when a gate signal of the preset row is detected to be a low-level signal, and outputting a second enable signal when the gate signal of the preset row is detected to be a high-level signal, the drive is for outputting a first driving signal according to the first enable signal, and outputting a second driving signal according to the second enable signal, a current value of the first driving signal is less than a current value of the second driving signal.

16. The display driving circuit according to claim 15, wherein the detector further comprises an initial signal input terminal, the detector is also for outputting an enable signal corresponding to an initial signal input through the initial signal input terminal.

17. The display driving circuit according to claim 16, wherein the detector comprises:
- a first semiconductor transistor, wherein a gate of the first semiconductor transistor is connected with the detection signal input terminal, and a source of the first semiconductor transistor is grounded; and
- a second semiconductor transistor, wherein a source of the second semiconductor transistor is connected with an external power source, a drain of the second semiconductor transistor is connected with the enable signal output terminal, and a drain of the first semiconductor transistor is connected with a drain of the second semiconductor transistor;
- when the detection signal input terminal is input with a high-level signal, the first semiconductor transistor and the second semiconductor transistor are both conducted.

18. The display driving circuit according to claim 16, wherein the detector further comprises a third resistor, the third resistor is connected between the detection signal input terminal and the drain of the second semiconductor transistor.

19. The display driving circuit according to claim 15, wherein the drive comprises a data driving circuit which comprises:
- a data driving module comprising a signal input terminal and a signal output terminal, and the signal output terminal being the driving signal output terminal of the drive;
- a first current source for providing a first reference current signal;
- a second current source for providing a second reference current signal; and
- a switch being switched according to an enable signal of the detector to connect the signal input terminal of the data driving module with the first current source or with the second current source.

20. A display panel, comprising:
- a liquid crystal screen, wherein the liquid crystal screen comprises a data line and a scan line, the data line and the scan line are all connected with a thin film transistor on the liquid crystal screen, the scan line is for controlling the thin film transistor to turn on or turn off, the data line is for charging the thin film transistor;
- a display driving circuit connected with the liquid crystal screen and for driving the liquid crystal screen to display;
- wherein, the display driving circuit comprises:
- a drive, wherein the drive comprises a driving signal output terminal and an enable signal input terminal, the driving signal output terminal is electrically connected with a data line of the display panel; and
- a detector, wherein the detector comprises a detection signal input terminal and an enable signal output terminal, the detection signal input terminal is electrically connected with a gate signal terminal of a preset row of the display panel, and the enable signal output terminal is electrically connected with the enable signal input terminal of the drive;
- wherein the detector is for detecting a gate signal of the preset row, and output a corresponding enable signal according to a detection result, and the drive is for outputting different driving signals according to different enable signals.

* * * * *